United States Patent
Rampson et al.

(10) Patent No.: US 8,786,628 B2
(45) Date of Patent: Jul. 22, 2014

(54) RENDERING ELECTRONIC CHART OBJECTS

(75) Inventors: Benjamin Edward Rampson, Redmond, WA (US); Randall L. Davis, Bothell, WA (US); B. Scott Ruble, Bellevue, WA (US); Daniel Philip Cory, Seattle, WA (US); Andrew John Verprauskus, Clyde Hill, WA (US); Barry Christopher Allyn, Snohomish, WA (US); Marcus Eduardo Markiewicz, Mercer Island, WA (US); Matthew John Androski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 721 days.

(21) Appl. No.: 12/049,280

(22) Filed: Mar. 15, 2008

(65) Prior Publication Data

US 2009/0073187 A1  Mar. 19, 2009

Related U.S. Application Data

(60) Provisional application No. 60/972,428, filed on Sep. 14, 2007.

(51) Int. Cl.
  *G09G 5/00*  (2006.01)
(52) U.S. Cl.
  USPC ............ 345/619; 345/629; 345/635; 345/441
(58) Field of Classification Search
  USPC ................ 345/419, 522, 501, 503, 418, 440, 345/440.2, 441, 619, 629, 635; 715/215, 715/175
See application file for complete search history.

(56) References Cited

U.S. PATENT DOCUMENTS

| 5,175,805 A | 12/1992 | Carrie |
| 5,228,119 A | 7/1993 | Mihalisin et al. |

(Continued)

FOREIGN PATENT DOCUMENTS

| WO | WO 2005/111873 A1 | 11/2005 | ............... G06F 17/50 |
| WO | WO 2010/126802 A2 | 11/2010 | ................ G06F 3/14 |
| WO | WO 2010/126803 A2 | 11/2010 | ................ G06F 9/44 |

OTHER PUBLICATIONS

Millan, E. et al., "Imposters and pseudo-instancing for GPU crowd rendering," *GRAPHITE*, pp. 49-55 (2006).

(Continued)

*Primary Examiner* — Chante Harrison
(74) *Attorney, Agent, or Firm* — Jim Ross; Micky Minhas

(57) ABSTRACT

Rendering electronic chart objects is provided. A set of chart elements having a common set of properties is identified. Formatting attributes of the chart elements and the data point locations for each chart element are also identified. Path information is generated for the chart elements that includes the formatting attributes and the data point locations. The path information is provided to a rendering engine that renders a chart element. Each chart element in the set is displayed on a display screen. Chart elements having a common set of properties are only rendered once. Alternatively, chart objects are rendered by generating and storing an image of chart objects having a common geometry and common properties and by copying the stored image to each data point location. Dynamic selection of rendering engines based on property and performance criteria may be utilized to enhance rendering performance.

20 Claims, 5 Drawing Sheets

(56) References Cited

U.S. PATENT DOCUMENTS

| | | | |
|---|---|---|---|
| 5,461,708 A | 10/1995 | Kahn | 395/140 |
| 5,581,677 A | 12/1996 | Myers et al. | 395/140 |
| 5,859,958 A | 1/1999 | Chan et al. | |
| 5,936,641 A * | 8/1999 | Jain et al. | 345/503 |
| 5,982,399 A * | 11/1999 | Scully et al. | 345/522 |
| 6,023,279 A | 2/2000 | Sowizral et al. | |
| 6,052,125 A | 4/2000 | Gardiner et al. | |
| 6,243,172 B1 | 6/2001 | Gauthier et al. | |
| 6,466,211 B1 | 10/2002 | Havre et al. | |
| 6,523,074 B1 | 2/2003 | Dianda et al. | 710/100 |
| 6,529,900 B1 | 3/2003 | Patterson et al. | 707/3 |
| 6,747,650 B2 | 6/2004 | Turner et al. | |
| 7,068,267 B2 | 6/2006 | Meanor et al. | |
| 7,071,940 B2 | 7/2006 | Malik | |
| 7,176,923 B2 | 2/2007 | Vignet | |
| 7,404,194 B2 | 7/2008 | Wason et al. | |
| 7,454,439 B1 | 11/2008 | Gansner et al. | |
| 7,471,417 B1 * | 12/2008 | Chien | 345/581 |
| 7,586,500 B2 * | 9/2009 | Herceg et al. | 345/619 |
| 7,734,607 B2 | 6/2010 | Grinstein et al. | |
| 7,765,182 B2 | 7/2010 | Peurach et al. | |
| 8,427,482 B2 * | 4/2013 | Wallace et al. | 345/441 |
| 2002/0199156 A1 | 12/2002 | Chess et al. | |
| 2003/0061309 A1 | 3/2003 | Brown et al. | |
| 2003/0151604 A1 | 8/2003 | Kaufman et al. | |
| 2003/0167278 A1 | 9/2003 | Baudel | |
| 2004/0036712 A1 | 2/2004 | Cardno | |
| 2004/0066384 A1 * | 4/2004 | Ohba | 345/419 |
| 2004/0183811 A1 | 9/2004 | Qi et al. | |
| 2004/0189668 A1 | 9/2004 | Beda et al. | |
| 2004/0217956 A1 | 11/2004 | Besl et al. | |
| 2004/0233193 A1 | 11/2004 | Margadant | |
| 2005/0060300 A1 | 3/2005 | Stolte et al. | |
| 2005/0183003 A1 | 8/2005 | Peri | |
| 2006/0017724 A1 | 1/2006 | Tsao | |
| 2006/0059414 A1 * | 3/2006 | Cory et al. | 715/500 |
| 2006/0066621 A1 * | 3/2006 | Herceg et al. | 345/501 |
| 2006/0202989 A1 | 9/2006 | Yinghui | |
| 2006/0236232 A1 * | 10/2006 | Yuasa et al. | 715/517 |
| 2006/0285152 A1 | 12/2006 | Skillen | |
| 2007/0101322 A1 | 5/2007 | Muschett et al. | 717/168 |
| 2007/0171716 A1 | 7/2007 | Wright et al. | |
| 2007/0174762 A1 | 7/2007 | Plant | |
| 2007/0188494 A1 | 8/2007 | Agutter et al. | |
| 2007/0261100 A1 | 11/2007 | Greeson et al. | |
| 2008/0172629 A1 | 7/2008 | Tien et al. | |
| 2008/0180458 A1 | 7/2008 | Favart et al. | 439/676 |
| 2008/0288306 A1 | 11/2008 | MacIntyre et al. | |
| 2008/0288889 A1 | 11/2008 | Hunt et al. | |
| 2009/0019429 A1 | 1/2009 | Randow et al. | |
| 2009/0089453 A1 | 4/2009 | Bohan et al. | 709/246 |
| 2009/0254827 A1 | 10/2009 | Gonze et al. | |
| 2010/0162152 A1 | 6/2010 | Allyn et al. | 715/767 |
| 2010/0257474 A1 | 10/2010 | Bochatay et al. | |
| 2010/0277507 A1 | 11/2010 | Allyn et al. | |
| 2010/0281392 A1 | 11/2010 | Allyn et al. | |
| 2010/0332994 A1 | 12/2010 | Istvan et al. | |
| 2011/0015917 A1 | 1/2011 | Wang et al. | |

OTHER PUBLICATIONS

Rusinkiewicz, S. et al., " QSplat: A Multiresolution Point Rendering System for Large Meshes," *SIGGRAPH*, pp. 343-352 (2000).

International Search report issued Nov. 30, 2010 in PCT/US2010/032308 filed Apr. 23, 2010. (PCT 1267US01).

International Search report issued Nov. 30, 2010 in PCT/US2010/032307 filed Apr. 23, 2010. (PCT 1268US01).

Denkowski, M. et al., "Development of the Cross-Platform Framework for the Medical Image Processing," *Annales UMCS Informatica*, vol. AI 3, pp. 159-167 (2005).

Hill, B. et al., "An application Framework and Intelligent Graphic User Interface for Multiple Accelerator Codes," http://www.slac.stanford.edu/econf/C980914/papers/C-We21.pdf, 5 pages (1998).

Jern, M., "3D Data Visualization on the Web," *Proceedings of the 1998 Conference on MultiMedia Modeling*, pp. 90-99 (Oct. 12-15, 1998).

NetCharts Server, *Visual Mining, Inc.*, http://www.visualmining.com/products_for_developers/NetCharts_Server.php, pp. 1-4 (Copyright 2009).

Xcelsius | XL, *Software Add-ons*, http://add-ons.co.uk/ product.aspx?name=Xcelsius%7CXL, pp. 1-3 (Copyright 2005).

U.S. Official Action dated Jun. 23, 2011 for U.S. Appl. No. 12/433,327.

U.S. Official Action dated Jun. 30, 2011 for U.S. Appl. No. 12/433,288.

U.S. Official Action dated Dec. 7, 2011 for U.S. Appl. No. 12/433,327.

Li et al., Texture Partitioning and Packing for Accelerating Texture-Based Volume Rendering, Graphics Interface, 2003, vol. 81, pp. 1-10.

U.S. Official Action dated Dec. 15, 2011 for U.S. Appl. No. 12/433,288.

Chinese Office Action dated Aug. 30, 2012 in Chinese Patent Application 201080019471.7 10 pages.

European Search Report dated Aug. 9, 2012 in European Application No. 10770165.8-1243/2425332 (PCT/US2010/032308), 5 pages.

Notice of Allowance dated May 22, 2013 for U.S. Appl. No. 12/433,288.

Chinese Office Action dated Jan. 31, 2013 in Application No. 201080019471.7, 8 pages.

Chinese Office Action dated May 23, 2013 in Application No. 201080019471.7, 8 pages.

Chilean Office Action dated Aug. 30, 2013 in Application No. 2655-2011, 11 pages.

Notice of Allowance dated Nov. 15, 2012 for U.S. Appl. No. 12/433,288.

* cited by examiner

Fastest Rendering Mode
(Basic Fills)

Middle Rendering Mode
(Complex Fills but No Effects)

Slowest Rendering Mode
(Complex Fills and All Effects)

RENDERING ELECTRONIC CHART OBJECTS

RELATED APPLICATIONS

This application claims the benefit of U.S. Provisional Application Ser. No. 60/972,428, entitled "Rendering Electronic Chart Objects", filed with the U.S. Patent and Trademark Office on Sep. 14, 2007 and incorporated herein by reference in its entirety.

BACKGROUND

Charts often include complex objects that may consist of thousands of points and many individual shapes/elements. Rendering individual shapes in a chart can be a timely process, and performance can be directly impacted by the number of points to be rendered. As the graphics used in charts become more complex and new effects are introduced, the complexity of the charting process increases, and performance is diminished. Although users expect the graphics quality to increase, they also expect performance to improve, resulting in two often conflicting goals.

SUMMARY

The present disclosure is directed to systems and methods for rendering electronic chart objects and for dynamically selecting a rendering engine.

According to one embodiment, a method for rendering a single view element of an electronic chart object includes identifying a set of chart elements having a common set of properties. Formatting attributes and data point locations for the chart elements are also identified. Path information is generated for the chart elements that includes the formatting attributes and the data point locations. The path information is provided to a rendering engine which uses the path information to render a chart element. Each chart element in the set of chart elements is displayed on a display screen. Chart elements having a common set of properties are only rendered once.

According to another embodiment, a method for rendering an electronic chart object includes identifying a set of chart elements with common geometry and common properties and identifying data point locations for the chart elements. The geometry and property information are passed to a rendering engine which renders a shape from the geometry and property information. An image of the rendered shape is stored and the image is copied to each data point location. Chart elements having a common geometry and common properties are only rendered once.

According to another embodiment, a method for dynamically selecting a rendering engine for rendering electronic chart objects includes receiving data to be rendered and parsing the properties of this data. The parsed properties are compared with the capabilities of available rendering engines. A rendering engine is selected based on a comparison of the parsed properties with the capabilities of the available rendering engines. The chart element is rendered with the selected rendering engine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The accompanying drawings incorporated in and forming a part of the specification illustrate several aspects of the present disclosure, and together with the description serve to explain the principles of the disclosure. In the drawings.

DETAILED DESCRIPTION

This application is directed to systems and methods for rendering electronic chart objects on a display screen. The systems include one or more rendering engines that are dynamically selected based on rendering the required chart object features with a minimum amount of overhead. One method includes use of a single mode element wherein multiple chart elements of a similar type are grouped together and rendered once. An instancing method includes creating one image of a chart element and reusing that image multiple times on a display screen.

Figure 1:
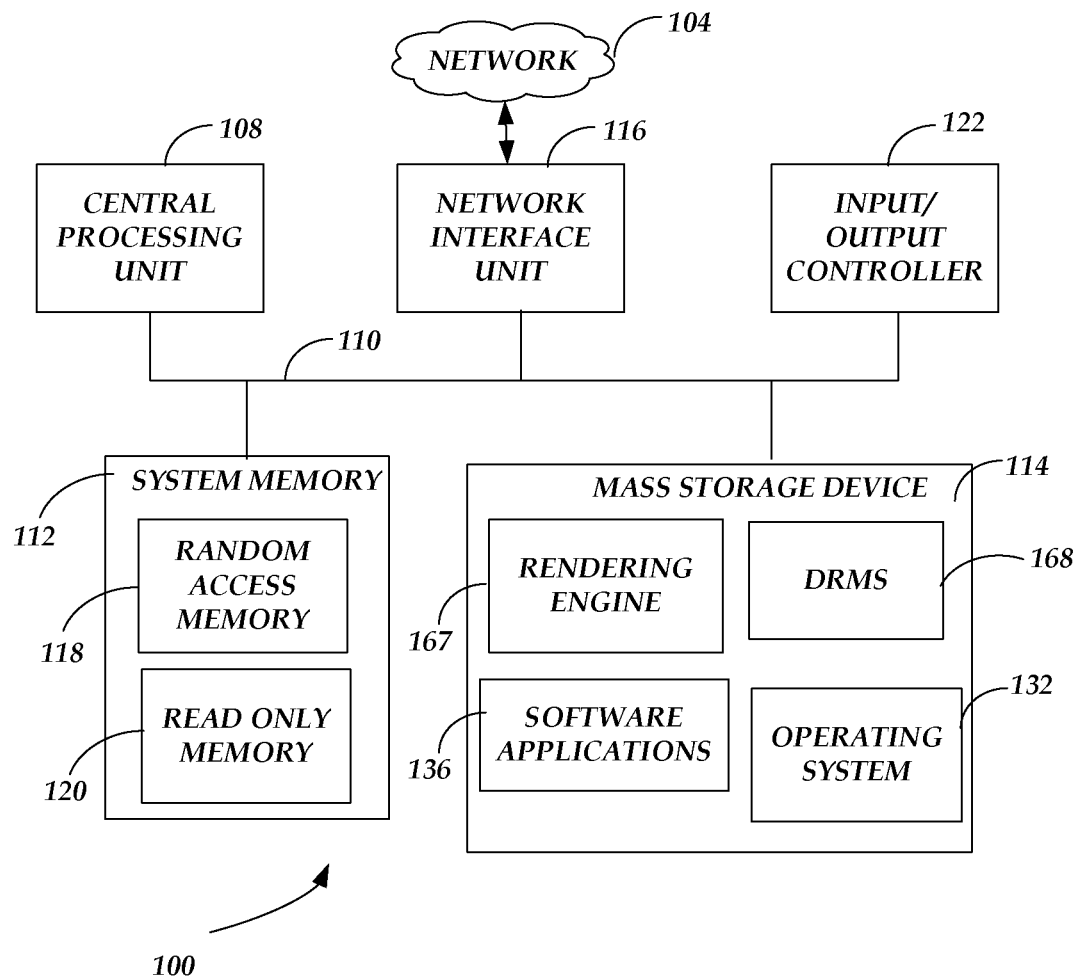
FIG. 1 shows an example computing operating environment, for example, a desktop computer, a laptop computer or a mobile computing device, in which embodiments of the invention may be used.

FIG. 1 is a block diagram illustrating an example computing operating environment, for example, a desktop or laptop computer, in which embodiments of the invention may be practiced. Referring now to FIG. 1, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative operating environment for embodiments of the invention will be described. As shown in FIG. 1, computer 100 comprises a general purpose desktop, laptop, handheld, mobile or other type of computer (computing device) capable of executing one or more application programs. The computer 100 includes at least one central processing unit 108 ("CPU"), a system memory 112, including a random access memory 118 ("RAM") and a readonly memory ("ROM") 120, and a system bus 110 that couples the memory to the CPU 108. A basic input/output system containing the basic routines that help to transfer information between elements within the computer, such as during startup, is stored in the ROM 120. The computer 102 further includes a mass storage device 114 for storing an operating system 132, application programs, and other program modules.

The mass storage device 114 is connected to the CPU 108 through a mass storage controller (not shown) connected to the bus 110. The mass storage device 114 and its associated computer-readable media provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed or utilized by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to one embodiment, rendering engine (RE) 167 is operative to render graphical objects such as chart shapes, elements or markers on a display screen as described above. A dynamic rendering mode switching module (DRMS) 168 is a software module operative to automatically switch between rendering modes or rendering engines to effect improved rendering performance as described above.

According to embodiments of the invention, the applications 136 may comprise many types of software applications, such as an electronic mail program, a calendaring program, an Internet browsing program, and the like. An example of such programs is OUTLOOK manufactured by MICROSOFT CORPORATION. The application 136 may include a number of other types of software applications including a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE manufactured by MICROSOFT CORPORATION.

According to various embodiments of the invention, the computer 100 may operate in a networked environment using logical connections to remote computers through a network 104, such as a local network, the Internet, etc. for example. The computer 102 may connect to the network 104 through a network interface unit 116 connected to the bus 110. It should be appreciated that the network interface unit 116 may also be utilized to connect to other types of networks and remote computing systems. The computer 100 may also include an input/output controller 122 for receiving and processing input from a number of other devices, including a keyboard, mouse, etc. (not shown). Similarly, an input/output controller 122 may provide output to a display screen, a printer, or other type of output device.

As mentioned briefly above, a number of program modules and data files may be stored in the mass storage device 114 and RAM 118 of the computer 100, including an operating system 132 suitable for controlling the operation of a networked personal computer, such as the WINDOWS operating systems from MICROSOFT CORPORATION of Redmond, Wash. The mass storage device 114 and RAM 118 may also store one or more program modules. In particular, the mass storage device 114 and the RAM 118 may store application programs, such as a software application 124, for example, a word processing application, a spreadsheet application, a slide presentation application, a database application, etc.

According to an embodiment, a single view element is provided to group multiple chart objects of a single type into a common view. Representing and combining multiple chart elements of a similar type into a single view element with complex geometry that can be rendered once increases performance (e.g., rendering all similar columns of a column chart as a single view, or rendering an entire series in a line chart as a single element vs. rendering each of the line segments individually). A resulting combined complex chart object shape may be rendered at once.

According to this embodiment, a group of elements, for example, diamond-shaped graphical elements representing data points to be graphed in a chart may have common properties and may have the same shape, but may be presented in different locations and sizes in a graphical chart presentation. According to this embodiment the elements may be rendered as a single element with a complex geometry that shares a common set of properties, for example, coloring, fill effects and the like. For example, consider a scientist that desires to generate a chart having 30,000 data points and further desires that each data point be graphically represented as a diamond shape or square shape or circle shape or other. According to this embodiment, each shape for each of the 30,000 data points may be combined so that the graphical representation of the 30,000 shapes representing the 30,000 data points is created and rendered as a single combined complex graphical geometry rather than as 30,000 individually rendered shapes. That is, rather than having 30,000 individual points and corresponding shapes, a single graphical object is created by calculating an outline that forms each of the required shapes, e.g., 30,000 diamond shapes, where each of the shapes share all the same display properties such as coloring, shading, fill effects and line properties. Thus the computing processing overhead of calculating, creating and rendering each shape individually is avoided, because the calculation, creation and rendering of the combined shape occurs only once.

In order to calculate, create and render a single combined complex geometry for all shapes to be presented in the chart, a single path is calculated that will include the geometry of each shape representing each data point to be rendered and displayed in a given chart. Once such a path is constructed, a graphical rendering engine 167 may draw the resulting shape. For example, 4 points that comprise the shape of a diamond could be passed off to a path calculating module, for example, a Microsoft Windows operating system, operative to calculate a path formed by a connection of the 4 points and an associated rendering engine may draw the corresponding diamond shape. If a graphical chart is to be comprised of 10 such diamond-shaped elements (or, 10,000 elements), then the points comprising all the example diamond-shaped elements are passed to the path calculating module and all the paths making up each of the example elements may be constructed into one path. For example a single path may go from position 0, 0 to position 0, 2, to position 2, 4, to position 0, 4 and then skip to position 10, 10 to position 10, 2 to position 10, 4 and so on until a single complex geometric path is calculated for each shape to be rendered at each data point to be represented in the chart. The rendering engine 167 may then render each of the shapes by visually rendering those segments of the single path corresponding to the individual shapes. Thus, each of the numerous shapes is not created and rendered individually. Thus, each example diamond-shaped element is in effect a continuation of the previous element and a line between each desired element is not rendered in the chart which allows the single combined complex geometry to appear as many individual shapes positioned at corresponding data points in the chart.

Figure 2:
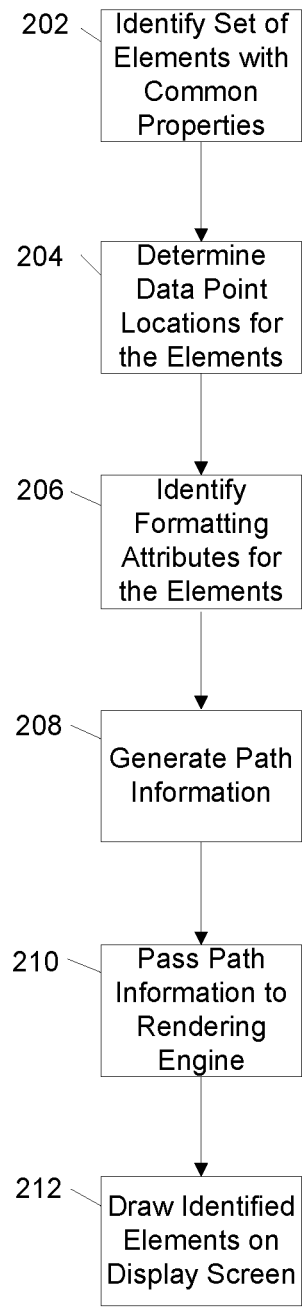
FIG. 2 shows a flow chart for an example method for rendering a single element view of an electronic chart object.

Referring now to FIG. 2, an example method for rendering a single element view of an electronic chart object will be described. At operation 202, according to an embodiment, a single view element of the present invention is generated by first identifying a set of elements that share a common set of properties. As should be appreciated, at operation 204 a list of data point locations may be established before identification of the shape geometry and formatting properties that will be required at each data point in the chart. Next, at operation 206, any formatting attributes set by a user for the elements to be displayed are identified, for example, coloring, shading, shape (e.g., diamond, square, circle, etc.). Next, at operation 208, a path is generated about each data point, including a path about each shape that will be generated and rendered at each data point. Next, at operation 210, the single path is passed to the rendering engine 167, and at operation 212 the rendering engine draws the path to the screen for the chart by showing the portions of the path that represent the individual shapes, e.g., diamonds, squares, triangles, circles, etc. and by not showing connecting lines between the different shapes. During the rendering process, any formatting attributes, such as coloring, solid vs. open, etc. are applied to the regions bounded by each shape. As will be described below, the rendering engine 167 utilized for drawing the path may be selected from a plurality of rendering engines so that a selected rendering engine is optimized for drawing the path. Thus, for less complex shapes and associated formatting attributes/properties, a lower processing overhead rendering engine may be utilized, and for more complex shapes and associated formatting attributes/properties, a higher processing overhead rendering engine may be utilized.

According to one embodiment if subsets of the shapes have different formatting properties, then each of the subsets may be constructed as an individual path and corresponding geometry. For example, if a given chart includes 100 points that will be diamond shaped and colored blue and an additional 50 points that will be square shaped and colored red, where the two types of elements (diamond-shaped versus square-shaped) will represent different types of data, then a first path and resulting geometry may be generated and rendered for the first subset of data points (e.g., the 100 points that will be diamond shaped), and a second path and resulting geometry may be generated and rendered for the second subset of data points (e.g., the 50 points that will be square shaped). Any formatting attributes, such as coloring, may be applied to the elements associated with the two subsets of elements during the rendering process. Thus, two rendering processes will take place for the example chart as opposed to 150 different rendering processes.

According to another embodiment, instancing is provided for rendering a given chart shape or element once, followed by reuse of an image, for example, a bitmap image, of the rendered shape or element as many times as needed to construct various data points in a displayed chart. According to instancing, an image, for example, a bitmap image, is created for a given chart element or shape, for example, a red diamond-shaped image. The image is then automatically copied to each data point location in a chart for generating a chart having the desired data shape/geometry and associated formatting attributes at each data point. Performance is improved by avoiding the overhead of calculating the geometry and rendering identical points over and over again. For example, instancing may be used on a scatter chart with 1000 markers/shapes/elements of the same type. Otherwise, each marker/shape/element must be rendered individually, resulting in 1000 calculations and associated renderings. With instancing, the image of the marker/shape/element is calculated once and is reused over and over again for as many data points as are required for the chart.

According to instancing, a desired shape/element, e.g., a diamond-shaped element is passed to the rendering engine 167 for generation and rendering. An array of the locations of each data point is also passed to the rendering engine so that the rendering engine will know where each shape/element/marker is to be drawn on the screen for the chart. The rendering engine 167 then renders a single chart shape, for example a blue colored diamond shape. The rendering engine then generates an image of the rendered shape. According to one embodiment, the rendering engine 167 generates a bitmap image. The rendering engine stores the image and then copies the stored image to each location of each data point that is to be presented in the associated chart. Instancing is advantageous for many types of chart elements, particularly where the chart element is comprised of a complex geometry with complicated formatting attributes. For example, if a user desires that each data point in a chart be marked with a square shape having a diagonal line bisecting the square shape into two triangles where each triangle is colored with a different color, according to instancing, such a shape need only be generated and rendered once, and then an image of the shape may be copied to each data point location in the desired chart without the need to re-generate and re-render the shape for each data point. As will be described below, the rendering engine 167 utilized for generating the bitmap image may be selected from a plurality of rendering engines so that a selected rendering engine is optimized for generating a given image. Thus, for less complex images, a lower processing overhead rendering engine may be utilized, and for more complex images, a higher processing overhead rendering engine may be utilized.

If a given chart includes subsets of data points where each subset is to be marked with a different shape/element/marker, then an image of a shape associated with each subset of data points may be generated and copied to each data point in the subset so that only one shape generation is required for each subset of data points.

According to instancing, generated images may also be used to create complex chart shapes by combining stored images. For example, consider a column chart where it is desired to show different attributes in different portions of each column associated with different data types. For example, consider that a top portion of a given column is to be colored red to identify a certain portion of the data illustrated by the column, a middle portion is to be colored white to identify a second portion of the data and a bottom portion is to be colored blue to identify a third portion of the data, instancing may be used to generate images associated with different portions of the column which will then be copied to or stamped onto the chart to generate the desired column.

Figure 3:
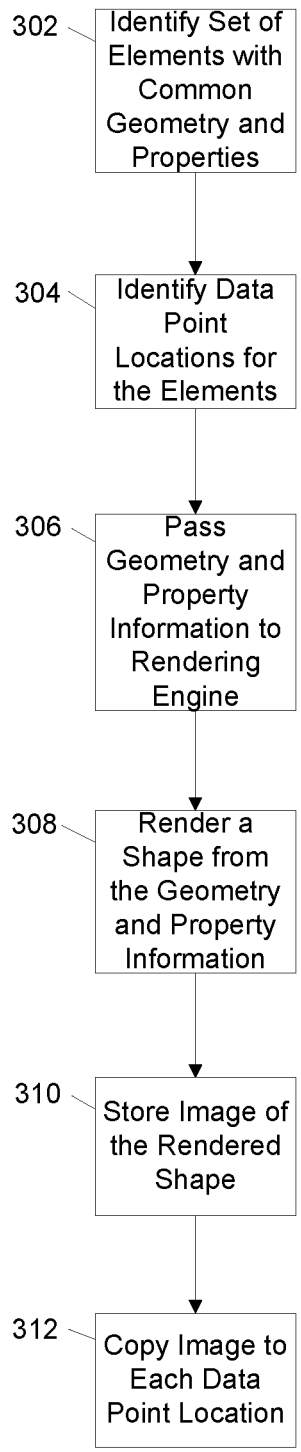
FIG. 3 shows a flow chart for an example method for rendering an electronic chart object via instancing.

Now referring to FIG. 3, an example method for rendering an electronic chart object via instancing is described. At operation 302 according to an embodiment for instancing, a set of elements that have a common geometry type and set of properties is identified for a given chart. Next, at operation 304 a list or array of locations in the chart is established where desired chart shapes/images/markers are to be rendered. As should be appreciated, the list of data point locations may be established before identification of the shape geometry and formatting properties. Next, at operation 306 the geometry type and properties for each image, for example, diamond-shaped, square, red color, beveling, etc., are passed to a rendering engine. At operation 308, the rendering engine then generates a single version of the desired chart shape with associated formatting properties and, at operation 310, stores an image, e.g., a bitmap image. At operation 312, the stored image is then copied to/rendered to each location of each data point to be represented in the desired chart.

According to another embodiment, dynamic rendering mode switching is provided for dynamically switching between rendering modes that have different graphics capabilities. By having multiple rendering modes that seamlessly switch between each other as needed, processing and rendering performance may be improved without diminishing graphics quality. In charting multiple rendering modes may be used. For example, a first rendering mode may be used for shapes without complex fills and effects. A second rendering mode may be used for complex shapes, fills and effects for producing very high quality graphics. According to an embodiment, the fastest rendering engine 167 that can render a given shape with the desired effects is always used. For basic shapes without complex effects and fills a quick rendering engine is used. As a complex fill is applied by the user, the individual shape, not the entire chart, is rendered by the quickest graphics engine that can support the complex effects. The change between rendering engines 167 is transparent to the user. Through this method we can use faster rendering paths when possible, making the charting process have greater performance while still offering the user the ability to apply complex effects and fills. According to another embodiment rendering modes may be manually selected where, for example, a user manually selects a lower quality but higher speed rendering mode where speed is more important to the user than the complexity or quality of the resulting renderings.

Figure 4:
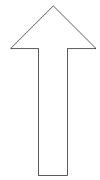
FIG. 4 shows example modules that illustrate a plurality of rendering modes that may be automatically utilized for generating and rendering chart objects.
Figure 4:
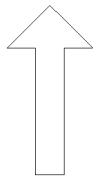

FIG. 4 is a block diagram illustrating a spectrum of rendering modes that may be automatically utilized for generating and rendering chart objects according to embodiments of the invention. The rendering mode levels illustrated in FIG. 4 are for purposes of example only are not limiting of the many numbers of rendering modes that may be utilized according to embodiments of the invention. As should be appreciated, the dynamic switching between rendering modes may be used for rendering graphical objects in any electronic document or object in addition to charts. Although a primary chart rendering mode will appear as a single mode to the user, it may be implemented using multiple shape rendering modes that have different capabilities and performances. For example, graphical elements may be rendered using a basic Graphical Device Interface (GDI) rendering engine 167, for example, GDI+ rendering engine 167, unless more complex effects or fills are required. If an element has effects or complex fills that require a rendering engine 167 with more capabilities, but that is potentially slower and more costly in terms of processing overhead (for example, processing time and memory use), then the latter rendering mode may be automatically utilized. This change between a lower capability and/or lower performance rendering mode and a higher capability and/or performance rendering mode will occur automatically and the user will not be aware that the change in rendering modes has occurred for a given chart element.

According to embodiments, rather than just having one single rendering engine 167 that renders all the complex geometries and effects or each shape or element in a graphical presentation, such as a chart, different rendering engines are utilized, each of which can support different sets of effects. Thus, as illustrated in FIG. 4, at a high end a given rendering engine may be utilized that can render everything, including complex shapes, fills and effects, but at the low end, another rendering engine may be utilized that can render simpler objects such as flat shapes with no fill other than solid and no effects. One or more intermediate rendering engines may be utilized between the high and low ends. For example, if an element is a simple 2-D shape with no effects, a simplest rendering engine may be used which will be quicker and require less processing overhead than a more complex rendering engine.

Figure 5:
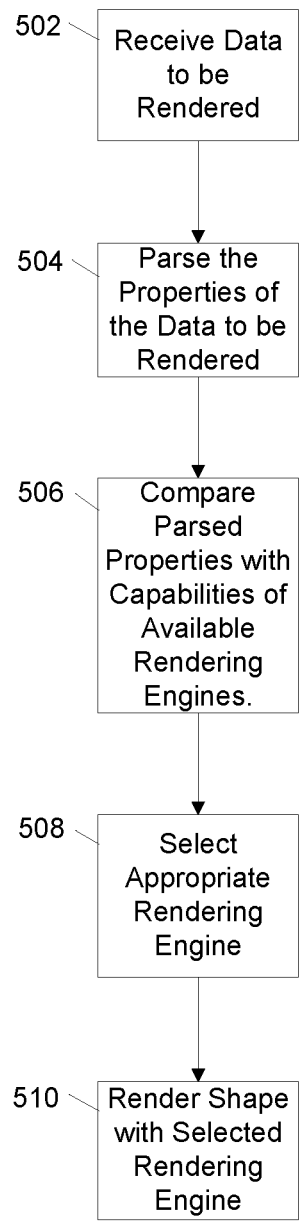
FIG. 5 shows a flowchart for an example method for dynamic rendering mode switching.

Referring now to FIG. 5, an example method for dynamic rendering mode switching is described. According to an embodiment, in order to effect dynamic rendering mode switching, at operation 502, a rendering process is started where a set of data is received requiring the rendering of one or more objects on a display screen. For example, a shape with one or more associated properties, for example, a diamond shape that is to be colored blue and have beveling along one edge is received that must be rendered at 20 locations on a chart. At operation 504, a dynamic rendering mode switching module 168 parses the properties of the desired rendering and at operation 506 compares those properties to the rendering capabilities supported by each available rendering engine. For example, if a desired graphical object requires a shadow and a flat fill, the dynamic rendering mode switching module determines the lowest processing overhead available rendering engine that can render the desired shape and associated properties. At operation 508, the rendering engine having the lowest processing overhead that can render the desired shape and associated properties is then selected for rendering the shape at operation 510. As should be appreciated, the dynamic rendering mode switching module 168 may switch between one or more separate rendering engines, each of which may be located together or may be accessible via a distributed computing network. On the other hand, each of the different rendering engines may be different operating modules of a single rendering engine that may be utilized based on the requirements of a given graphical element. The dynamic switching between rendering modes described herein is equally applicable to rendering via a single view element process or via an instancing process described above.

For example, the most complex rendering engine may be utilized that can render everything for a given element, and that rendering engine may calculate transparency on an object or anti-aliasing on an object, for example, using 8 separate kinds of passes that the rendering engine has to go over to calculate what the anti-aliasing aspect will look like when rendered. Consider for example the generation of a red diamond on a white background. Without anti-aliasing the pixel may either include bright red or bright white. With bright red pixels on a white background, the edges of the shape (e.g., diamond) may appear ragged or in a rough step looking pattern. With anti-aliasing a calculation and determination may be made that some of the pixels on the edges will be colored a lighter color, for example, pink, so that the resulting shape appears to have a smoother edge. Thus, for example, for a complex shape requiring 8 separate rendering passes to determine what level of ink to use to make the edges appear smoother, as described for the present example, if it is determined that a very smooth appearing edge is not necessary for all elements, then the dynamic rendering mode switching module 168 may use a lower overhead rendering mode where available, or the dynamic rendering mode switching module 168 may cause a reduction in rendering passes from 8 passes to 2 passes, for example. In the latter case, the mode switching is occurring within a single rendering engine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for rendering a single element view of an electronic chart object, the method comprising:
   identifying, by a computing device, a set of chart elements that have a common set of properties;
   determining, by a computing device, a plurality of data point locations for each chart element in the set of chart elements;
   generating, by a computing device, a path information for each of the chart elements, the path information comprising each of the plurality of data point locations for each chart element;
   providing, by a computing device, the path information to a rendering engine selected for rendering the set of chart elements, wherein the selected rendering engine is optimized relative to a plurality of properties associated with the set of chart elements;
   rendering the path information by the selected rendering, by a computing device, engine for display as a single shape, wherein each subsequent chart element of the set of chart elements is rendered as a continuation of a previous chart element of the set of chart elements.

2. The method of claim 1, further comprising identifying formatting attributes for the set of chart elements.

3. The method of claim 2, wherein rendering each chart element in the set of chart elements for display comprises displaying those of the plurality of data points visible on a display screen and applying the formatting attributes to each chart element in the set of chart elements visible on the display screen.

4. The method of claim 1, wherein the rendering engine is dynamically selected from a plurality of rendering engines based on a comparison of the common set of properties and the capabilities of the plurality of rendering engines.

5. The method of claim 1, wherein the plurality of data point locations comprise position coordinates for each chart element in the set of chart elements, wherein the position coordinates define a shape of each chart element.

6. The method of claim 5, wherein the shape is formed by connecting the position coordinates for each of the plurality of data point locations.

7. The method of claim 1, further comprising identifying a plurality of sets of chart elements, each of the plurality of sets of chart elements having a common set of properties, and rendering a plurality of chart elements, wherein chart elements having a common set of properties are only rendered once.

8. The method of claim 7, further comprising identifying formatting attributes for the plurality of sets of chart elements.

9. The method of claim 7, wherein rendering the single chart element wherein each chart element in the set of chart elements is visible on a display screen, but wherein a portion of the path between each chart element in the set of chart elements is not visible on the display screen includes displaying a single chart element for each of the plurality of sets of chart elements wherein each chart element in each of the plurality of sets of chart elements is visible on a display screen, but wherein a portion of the path between each chart element in each of the plurality of sets of chart elements is not visible on the display screen.

10. The method of claim 7, wherein the rendering engine is dynamically selected from a plurality of rendering engines based on a comparison of the common set of properties and the capabilities of the plurality of rendering engines.

11. A computing device for rendering a single element view of an electronic chart object, comprising:
    a memory storage; and
    a processing unit coupled to the memory storage, wherein the processing unit is operative to:
       identify a set of chart elements that have a common set of properties;
       determine a plurality of data point locations for each chart element in the set of chart elements;
       generate a path information for each of the chart elements, the path information comprising each of the plurality of data point locations for each chart element;
       provide the path information to a rendering engine selected for rendering the set of chart elements, wherein the selected rendering engine is optimized relative to a plurality of properties associated with the set of chart elements;
       render the path information by the selected rendering engine for display as a single shape, wherein each subsequent chart element of the set of chart elements is rendered as a continuation of a previous chart element of the set of chart elements.

12. The computing device of claim 11, wherein the processor is further operative to identify formatting attributes for the set of chart elements.

13. The computing device of claim 12, wherein the processor, in rendering each chart element in the set of chart elements for display, is operative to display those of the plurality of data points visible on a display screen and apply the formatting attributes to each chart element in the set of chart elements visible on the display screen.

14. The computing device of claim 11, wherein the rendering engine is dynamically selected from a plurality of rendering engines based on a comparison of the common set of properties and the capabilities of the plurality of rendering engines.

15. The computing device of claim 11, wherein the plurality of data point locations comprise position coordinates for each chart element in the set of chart elements, wherein the position coordinates define a shape of each chart element.

16. A computer-readable storage device which stores a set of instructions which when executed performs a method for rendering a single element view of an electronic chart object, the method executed by the set of instructions comprising:
    identifying a set of chart elements that have a common set of properties;
    determining a plurality of data point locations for each chart element in the set of chart elements;
    generating a path information for each of the chart elements, the path information comprising each of the plurality of data point locations for each chart element;

providing the path information to a rendering engine selected for rendering the set of chart elements, wherein the selected rendering engine is optimized relative to a plurality of properties associated with the set of chart elements;

rendering the path information by the selected rendering engine for display as a single shape, wherein each subsequent chart element of the set of chart elements is rendered as a continuation of a previous chart element of the set of chart elements.

17. The computer-readable storage device of claim 16, further comprising identifying formatting attributes for the set of chart elements.

18. The computer-readable storage device of claim 17, wherein rendering each chart element in the set of chart elements for display comprises displaying those of the plurality of data points visible on a display screen and applying the formatting attributes to each chart element in the set of chart elements visible on the display screen.

19. The computer-readable storage device of claim 16, wherein the rendering engine is dynamically selected from a plurality of rendering engines based on a comparison of the common set of properties and the capabilities of the plurality of rendering engines.

20. The computer-readable storage device of claim 16, wherein the plurality of data point locations comprise position coordinates for each chart element in the set of chart elements, wherein the position coordinates define a shape of each chart element.

* * * * *